US009736792B2

(12) United States Patent
Balasubramanian et al.

(10) Patent No.: US 9,736,792 B2
(45) Date of Patent: *Aug. 15, 2017

(54) METHOD FOR PREVENTING OVERHEATING OF INTERNAL COMPONENTS OF A MOBILE TERMINAL

(71) Applicant: Apple Inc., Cupertino, CA (US)

(72) Inventors: Sanjeevi Balasubramanian, San Jose, CA (US); Ruben Caballero, San Jose, CA (US); Ricardo R. Velasco, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,891

(22) Filed: Sep. 22, 2015

(65) Prior Publication Data

US 2016/0112967 A1    Apr. 21, 2016

Related U.S. Application Data

(63) Continuation of application No. 13/902,573, filed on May 24, 2013, now Pat. No. 9,161,314.

(60) Provisional application No. 61/757,624, filed on Jan. 28, 2013, provisional application No. 61/753,274, filed on Jan. 16, 2013.

(51) Int. Cl.
| | |
|---|---|
| *H04M 1/38* | (2006.01) |
| *H04W 52/30* | (2009.01) |
| *H04W 52/22* | (2009.01) |
| *H04W 52/28* | (2009.01) |
| *H04W 52/36* | (2009.01) |
| *G08B 21/18* | (2006.01) |

(52) U.S. Cl.
CPC .......... *H04W 52/30* (2013.01); *G08B 21/182* (2013.01); *H04W 52/22* (2013.01); *H04W 52/281* (2013.01); *H04W 52/367* (2013.01)

(58) Field of Classification Search
CPC .. H04W 52/281; H04W 52/367; H04W 52/22
USPC ............ 455/572, 127.1, 127.2, 127.3, 127.4, 455/127.5, 343.1, 343.2, 343.3, 343.4, 455/343.5, 343.6, 573, 574
See application file for complete search history.

(56) References Cited

U.S. PATENT DOCUMENTS

| | | | |
|---|---|---|---|
| 6,169,884 | B1 | 1/2001 | Funk |
| 7,206,567 | B2 | 4/2007 | Jin et al. |
| 7,860,018 | B2 | 12/2010 | Raith |
| 8,175,545 | B2 | 5/2012 | Rofougaran |
| 2011/0230163 | A1* | 9/2011 | Jin .......................... H04M 1/66 455/404.1 |

(Continued)

*Primary Examiner* — Lester Kincaid
*Assistant Examiner* — Sayed T Zewari
(74) *Attorney, Agent, or Firm* — Blakely Sokoloff Taylor & Zafman LLP

(57) ABSTRACT

A method implemented on a mobile device that starts by receiving a temperature reading from a sensor included on the mobile device. The temperature reading is compared to a threshold temperature and a power cap is set when the temperature reading is greater than the threshold temperature. The power cap is a maximum transmission power of the mobile device. The method then determines if the mobile device is transmitting a critical message. The power cap is released for a period of time if the power cap is set and the mobile device is determined to be sending a critical message. Other embodiments are also described.

21 Claims, 8 Drawing Sheets

(56) References Cited

U.S. PATENT DOCUMENTS

2012/0076034 A1* 3/2012 Hoffman ............... H04W 24/08
                                                    370/252
2012/0135681 A1* 5/2012 Adams ................. H04B 5/0025
                                                    455/41.1

* cited by examiner

METHOD FOR PREVENTING OVERHEATING OF INTERNAL COMPONENTS OF A MOBILE TERMINAL

CROSS-REFERENCE TO RELATED APPLICATIONS

This application is a continuation of co-pending U.S. application Ser. No. 13/902,573 filed on May 24, 2013, which claims the benefit of priority of U.S. Provisional Patent Application No. 61/757,624, filed on Jan. 28, 2013 and U.S. Provisional Patent Application No. 61/753,274, filed on Jan. 16, 2013, U.S. Provisional Patent Application No. 61/757,624 and U.S. Provisional Patent Application No. 61/753,274 are specifically incorporated herein, in their entirety, by reference.

FIELD

An embodiment of the invention relate generally to methods of optimizing the temperature of a mobile device by setting and releasing a power cap on the transmit power of the mobile device.

BACKGROUND

Currently, when a mobile telephone communication device is in use, the components included in the device become heated. In addition to a user making telephone calls on his mobile telephone communication device, current mobile telephone communication devices allow the user to also perform a number of different functions such as taking a digital pictures or videos, browsing the Internet, listening to music, etc.

Accordingly, the extended use of the mobile telephone communication device requires that that the device be able to effectively allow the device to cool itself. Otherwise, the components of a mobile telephone communication device may be damaged or rendered non-function due to being exposed to high temperatures.

SUMMARY

In one embodiment of the invention, in order to optimize the temperature of the mobile device while ensuring a better user experience, the thermal control method that is implemented on the mobile device involves setting and releasing a power cap based on a temperature reading as well as feedback from the baseband on the uplink status. The method starts with the application processor in the mobile device receiving a temperature reading from a sensor that is included on the mobile device and comparing the temperature reading to a threshold temperature. The temperature reading may be received periodically. When the temperature reading is greater than the threshold temperature, the application processor sends a power cap setting message to a baseband that sets a power cap on the transmission power of the mobile device. The power cap is a maximum transmission power of the mobile device. The application processor may override the power cap by sending a power cap release message to the baseband. In this embodiment, if (i) the power cap is set and (ii) a feedback message is received from the baseband that indicates that the mobile device is transmitting a critical message, the application processor sends the power cap release message to release the power cap for a period of time. The critical message may be, for instance, a handover request message from the mobile device to a base station. In some embodiments, the power cap release message may also be sent to release the power cap for the period of time if (i) the power cap is set and (ii) an antenna feedback message is received from the baseband that indicates that the lower efficiency antenna is being used by the mobile device.

In another embodiment, the thermal control method that is implemented on the mobile device involves setting a power cap based on a temperature reading and releasing the power cap at a periodic or aperiodic interval of time for a period of time. In this embodiment, the application processor in the mobile device receives a temperature reading from a sensor on the mobile device and compares the temperature reading to a threshold temperature. When the temperature reading is greater than the threshold temperature, the application processor sends a power cap setting message to the baseband that sets a power cap on the transmission power of the mobile device. At a periodic or aperiodic time interval, the application processor sends a power cap release message to the baseband to release the power cap for a period of time. The periodic or aperiodic time interval is based on the message sending requirements of a network. Accordingly, the release of the power cap coincides with the periodic or aperiodic network-required reporting that is sent from the mobile device to the network. The messages being sent in the periodic or aperiodic network-required reporting may be critical messages.

In another embodiment, a thermal control method that is implemented on the mobile device involves setting a power cap based on a temperature reading and overriding the power cab when the mobile device is performing a voice call setup. In this embodiment, the method starts with the application processor receiving a temperature reading from the sensor that is included on the mobile device, comparing the temperature reading to a threshold temperature, and determining whether the mobile device is performing a voice call setup. The application processor sends a power cap setting message to the baseband to set the power cap when (i) the mobile device is not performing the voice call setup and (ii) the temperature reading is greater than the threshold temperature. In this embodiment, if (i) the power cap is set and (ii) the mobile device is performing the voice call setup, the application processor sends a power cap release message to the baseband to release the power cap.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

I. Overview of the Devices

Figure 1:
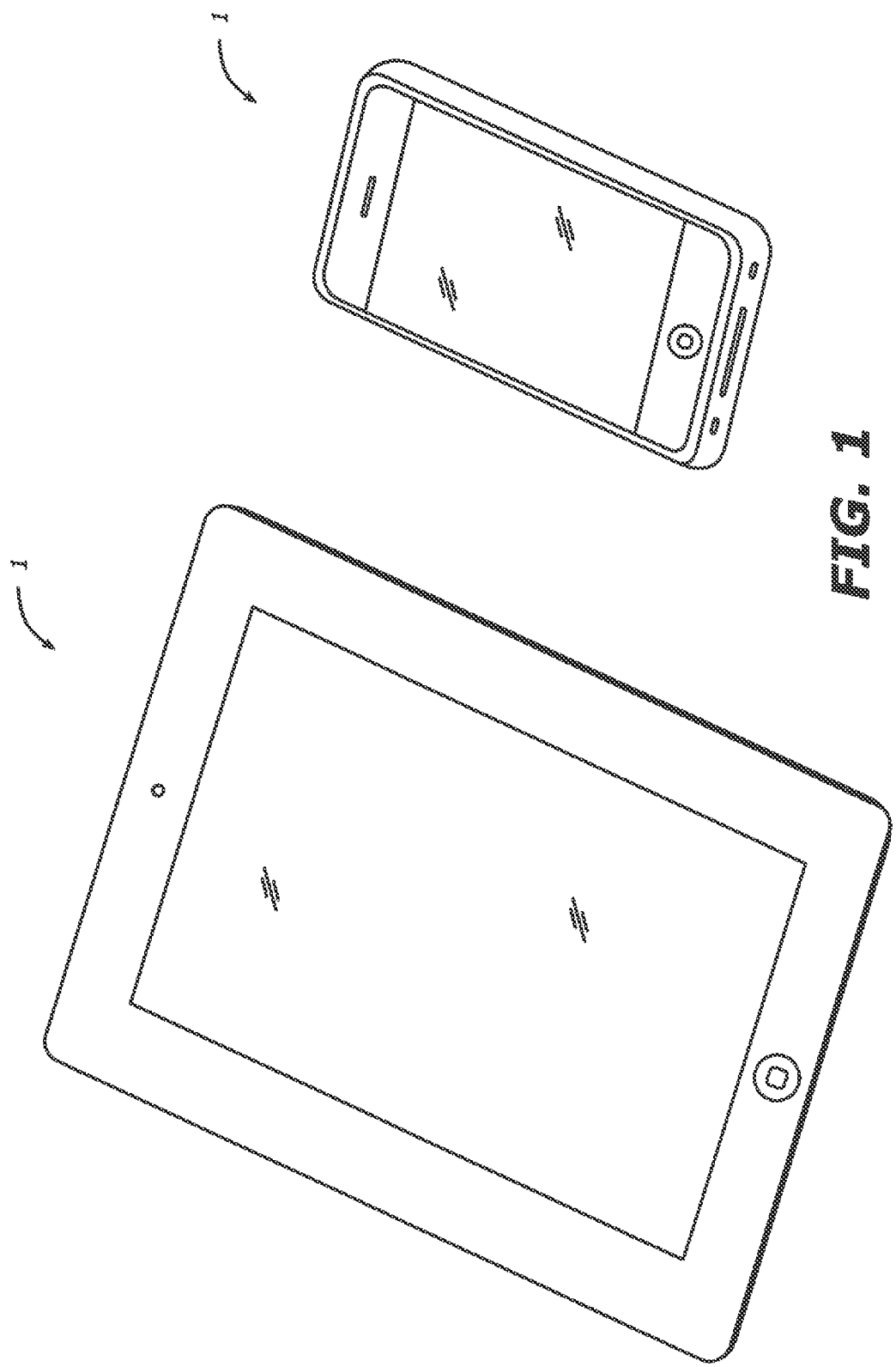
FIG. 1 illustrates examples of portable consumer electronic devices used in a network system according to one embodiment of the invention.

FIG. 1 illustrates examples of a portable consumer electronic device (or "mobile device") that is used in a network system according to one embodiment of the invention. As shown in FIG. 1, the mobile device 1 may be a mobile telephone communications device or a smartphone such as an iPhone™ device, from Apple Inc. of Cupertino, Calif., or a tablet computer such as an iPad™ device, from Apple Inc, of Cupertino, Calif. The mobile device 1 may also be a personal digital media player such an iPod™ device or a notebook computer such as a MacBook Air™ device, which are all from Apple Inc. of Cupertino, Calif.

As illustrated in FIG. 1, mobile device 1 may include a housing having a bezel. The bezel may be used to hold a display screen on the front face of the device 1. The display screen may also include a touch screen. Device 1 may also include one or more physical buttons and/or virtual buttons (on the touch screen). Device 1 may also include input-output components such as ports and jacks. For example, device 1 may include a microphone port, speaker ports, a headset jack and a wireless headset interface, to connect with a headset device.

Figure 2:
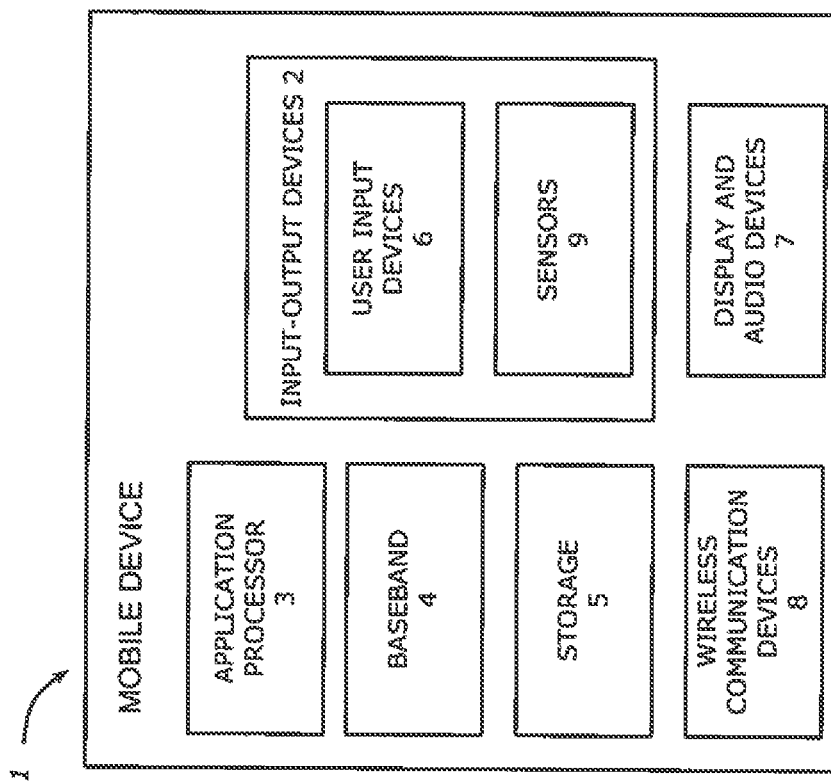
FIG. 2 shows a block diagram of the example mobile device.

Referring to FIG. 2, a block diagram of the example mobile device in which an embodiment of the invention may be implemented is depicted. However, it is noted that not every embodiment of the invention requires the entire architecture as illustrated in FIG. 2. As shown in FIG. 2, device 1 may include input-output devices 2, processing circuitry including an application processor 3 and a wireless communication processor (baseband) 4, and storage 5.

Input-output devices 2 allow the device 1 to receive data as well as provide data. In one embodiment, input-output devices 2 may include user input-output devices 6, display and audio devices 7, wireless communications devices 8, and sensors 9. Using the user input-output devices 6 such as the touch screen and physical buttons, the user may supply commands to control the operations of the device 1.

Display and audio devices 7 included in the device 1 may contain audio-video interface equipment such as jacks and other connectors for external devices. For example, the device 1 may include a headset jack to receive a headset plug.

Input-Output devices 2 may also include wireless communications devices 8 having communications circuitry such as radio frequency (RF) transceiver circuitry, antennas, etc. . . . In one embodiment, the microphone port and the speaker ports may be coupled to the communications circuitry to enable the user to participate in wireless telephone or video calls that allow or support wireless voice communications. A wireless voice call that uses the wireless communications devices 8 may be a voice-only call or a voice-and-video call that has been placed to or received from any one of a variety of different wireless communications networks and in accordance with any one of several different call protocols. These include: a cellular mobile phone network (e.g. a Global System for Mobile communication (GSM) network and a Long Term Evolution (LTE) network), including current 2G, 3G and 4G networks; and an IEEE 802.11 network (WiFi or Wireless Local Area Network, WLAN) which may support wireless voice over Internet protocol (VOIP). In one embodiment, the wireless communication devices 8 includes a plurality of antennas such as a lower efficiency antenna and a higher efficiency antenna.

The sensors 9 included in the device 1 may include temperature sensors that are coupled to the processing circuitry. The temperature sensors are sensors that obtain temperature readings at locations in the device 1.

As shown in FIG. 2, the processing circuitry includes an application processor 3 and a wireless communication processor (baseband) 4 that are communicatively coupled to each other via internal bus. The baseband 4 may be any kind of wireless processor, such as for example, cellular processor, a Wi-Fi processor, a Bluetooth processor, etc. Application processor 3 may be any kind of general-purpose processor such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The application processor 3 may be used to control the operations of device 1. For example, the processing circuitry may be coupled to the communications circuitry and execute software to control the wireless communications functionality of device 1 (e.g. initiating an outgoing call or answering an incoming call). In some cases, a particular function may be implemented as two or more pieces of software that are being executed by different hardware units of a processor.

In one embodiment, the processing circuitry is also coupled to the storage 5. The storage 5 stores instructions (e.g. software; firmware) which may be executed by the application processor 3 or baseband 4. In one embodiment, the application processor 3 and storage 5 are used to run a thermal control algorithm that uses feedback from the baseband 4 and the baseband 4 and the storage 5 are used to run a process that provides feedback including a wait time associated with the uplink status. The storage 34 may include one or more different types of storage such as hard disk drive storage, nonvolatile memory, and volatile memory such as dynamic random access memory.

Device 1 can communicate via a wired or wireless path with external devices such as accessories, computing equipment, and wireless network (not shown). Accessories may include headphones (e.g. a wireless cellular headset or audio headphones) and the wireless network may include any suitable network equipment such as cellular telephone base stations, cellular towers, wireless data networks, computers associated with wireless networks, etc. . . .

II. Thermal Control Method 13 in Feedback from the Baseband

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
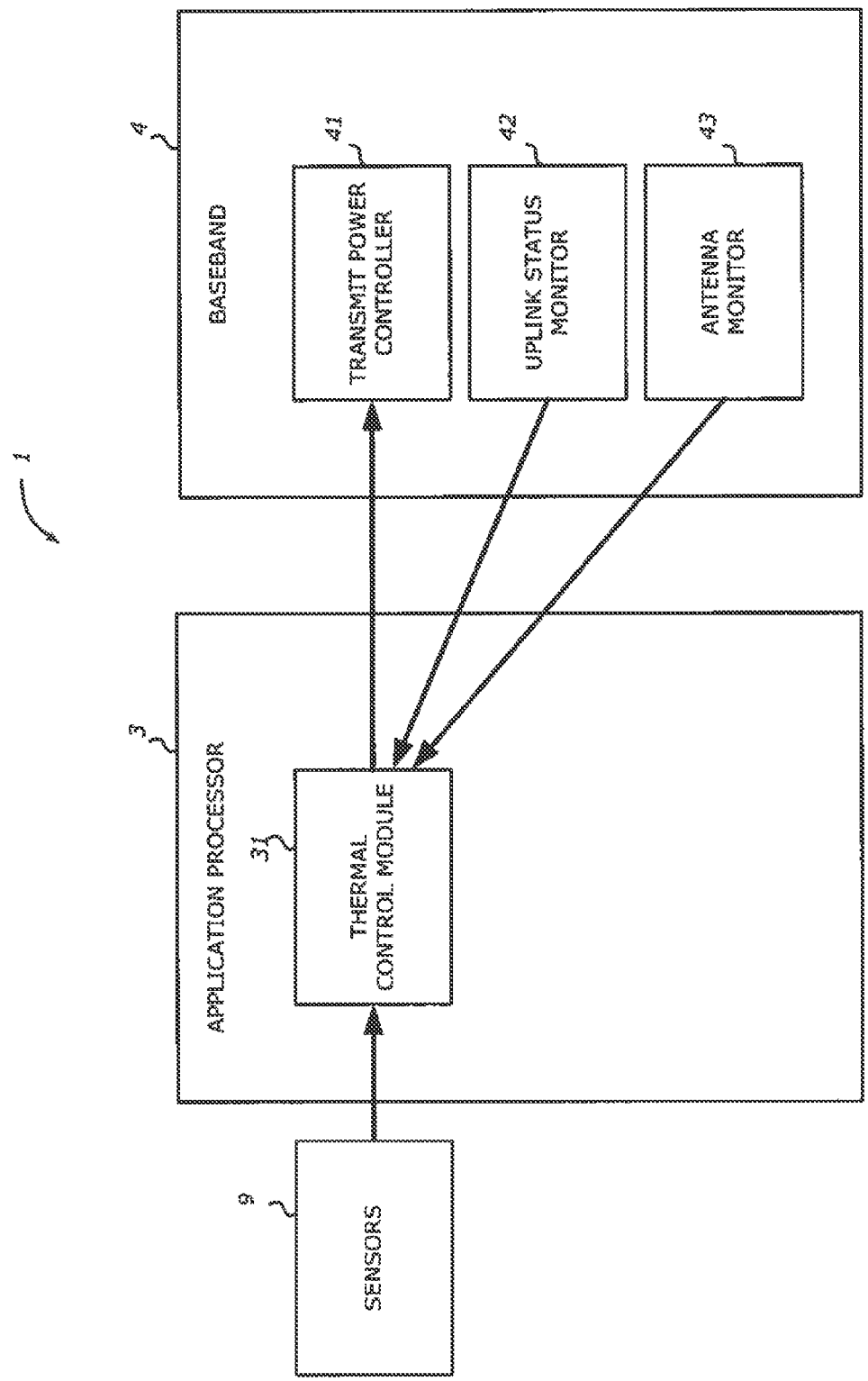
FIG. 3 shows a block diagram of the example mobile device implementing a thermal control method using feedback from the baseband according to one embodiment of the invention.

FIG. 3 shows a block diagram of the example mobile device 1 implementing a thermal control method using feedback from the baseband according to one embodiment of the invention. FIG. 3 illustrates sensors 9, application processor 3 and baseband 4 included in the mobile device 1 according to this embodiment of the invention. The sensors 9 include at least one temperature sensor that measures a temperature reading at a location in the mobile device 1. The application processor 3 includes a thermal control module 31 that periodically receives temperature reading ($T_{measured}$) from sensors 9 and compares the temperature reading to a threshold temperature ($T_{threshold}$). When the temperature reading from the sensors 9 exceeds the threshold temperature ($T_{measured} > T_{threshold}$), the thermal control module 31 sends a power cap setting message to the baseband 4.

As shown in FIG. 3, the baseband 4 includes a transmit power controller 41, an uplink status monitor 42 and an antenna monitor 43. The transmit power controller 41 sets a power cap on the transmit power of the mobile device 1 when it receives the power cap setting message from the thermal control module 31. The power cap may be a predetermined maximum transmission power of the mobile device 1. In some embodiments, the value of the power cap varies based on the temperature reading ($T_{measured}$). The mobile device 1 may store in nonvolatile memory a table including the value of the power cap to be applied for a plurality of temperature reading ($T_{measured}$) values. In some embodiments, the thermal control module 31 may read the corresponding power cap from the table in storage and provide the value of the power cap to be set to the transmit power controller 41 in the baseband 4. The transmit power controller 41 may then apply the power cap to an RF transceiver on the front end of the mobile device 1. By limiting the transmission power of the mobile device 1, the temperature generated due to the transmissions may also be limited. Accordingly, the temperature of the mobile device 1 may be decreased when the sensors 9 indicate that the temperature of the mobile device 1 approaches a threshold temperature by setting the power cap.

The uplink status monitor 42 included in the baseband 4 monitors whether the mobile device 1 is transmitting a critical message. For instance, the critical message may be handover request message from the mobile device 1 to a base station or a regular reporting message that is required by a network. A handover request message is a request sent to a current base station associated with a mobile device 1 to handover the association to a new base station. In the handover scenario, a mobile device 1 that is associated with Base Station A and is travelling towards Base Station B's range sends a handover request message to Base Station A when the mobile device 1 is located between two base stations (e.g., Base stations A and B). At that point, the mobile device 1 will require the highest level of transmit power since the mobile device 1 is located at a far distance geographically from the Base Station A. Accordingly, even if the temperature reading ($T_{measured}$) at the time of the handover is greater than the threshold temperature ($T_{threshold}$), it is not desirable to set a power cap on the transmit power since a high level of transmit power is required to send the handover request message. Thus, when the uplink status monitor 42 detects that the mobile device 1 is transmitting a critical message and that the power cap has been set by the transmit power controller 41, the uplink status monitor 42 sends a feedback message to the thermal control module 31. In some embodiments, the uplink status monitor 42 calculates the time needed ($T_{wait}$) for the mobile device 1 to complete sending the critical message and sends the time needed ($T_{wait}$) in the feedback message to the thermal control module 31. In other embodiments, the power cap is released until the mobile device 1 receives an acknowledgement from the base station that the critical message is received (e.g., handover response message). Upon receipt of the feedback message from the uplink status monitor 42 that indicates that the mobile device 1 is transmitting a critical message, the thermal control module 31 sends a power cap release message to the transmit power controller 41. When the transmit power controller 41 receives the power cap release message, the transmit power controller 41 releases the power cap on the RF transceiver in the front end of the mobile device 1. Accordingly, using the feedback message from the uplink status monitor 42, the thermal control module 31 may override a previously set power cap in order to ensure that the critical message is sent.

As shown in FIG. 3, the baseband 4 may include the antenna monitor 43 that monitors which antenna included in the mobile device 1 is being used. When the antenna monitor 43 determines that a lower efficiency antenna is being used by the mobile device 1, the antenna monitor 43 sends an antenna feedback message to the thermal control module 31. In this embodiment, when a power cap is previously set and the thermal control module 31 receives the antenna feedback message that indicates that the lower efficiency antenna is being used by the mobile device 1, the thermal control module 31 may send the power cap release message to the transmit power controller 41 to release the power cap. In this embodiment, the baseband 4 provides a feedback to the application processor 3 regarding the antenna in use in order to ensure that, when the lower efficiency antenna is in use, the required transmission power is provided to the antenna. In this manner, the transmission and reception by the lower efficiency antenna is optimized.

In one embodiment, the application processor 3 includes the portion of the thermal control module 31 that receives temperature readings ($T_{measured}$) from the sensor 9, compares the temperature reading to the threshold temperature ($T_{threshold}$), and sends the power cap setting message to the power transmit controller 41. However, in this embodiment, the baseband 4 includes the portion of the thermal control module 31 that sends the power cap release message to power transmit controller 41. In this embodiment, the portion of the thermal control module 31 in the baseband 4 determines whether to send a power cap release message to the power transmit controller 41 using the feedback from the uplink status monitor 42 and the antenna feedback from the antenna module 43 that are included in the baseband 4.

Figure 4:
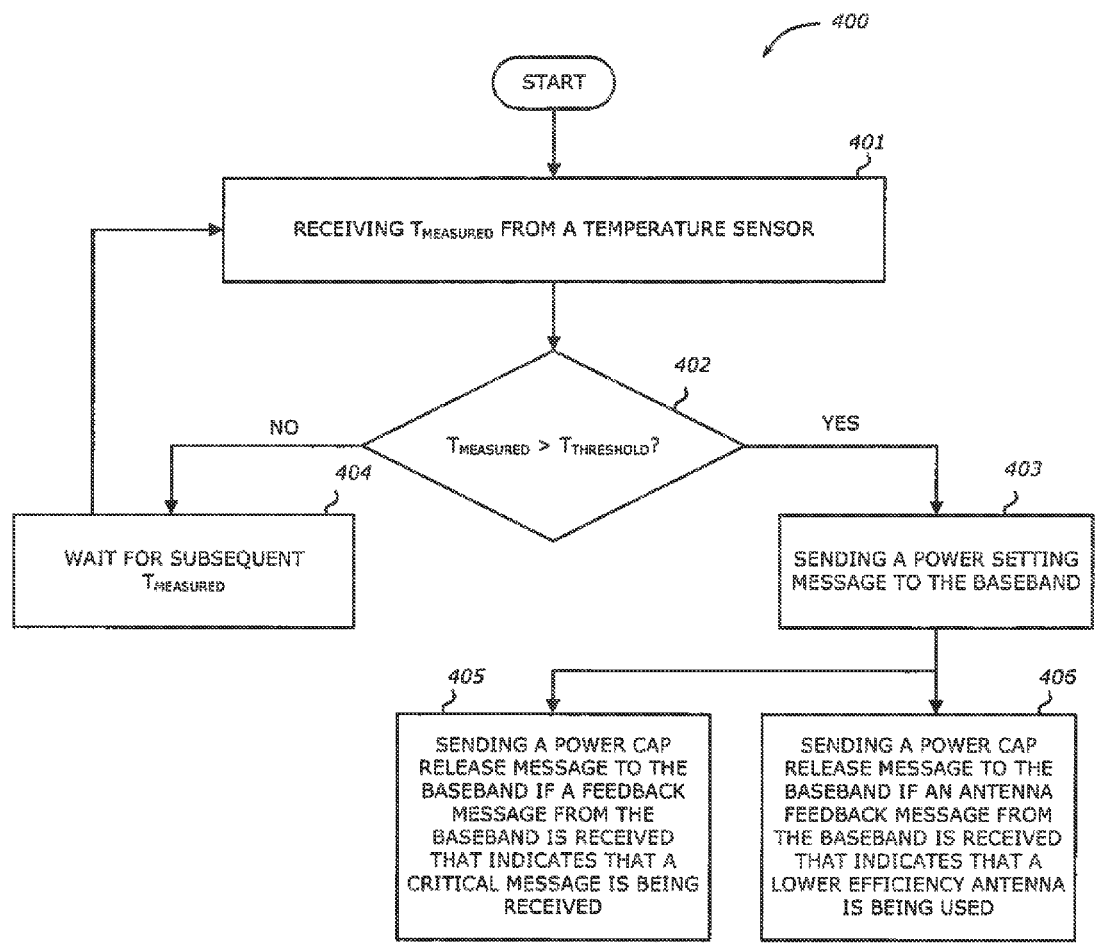
FIG. 4 shows a flow diagram of a thermal control method being implemented in a mobile device using feedback from the baseband according to one embodiment of the invention.

FIG. 4 shows a flow diagram of a thermal control method implemented in a mobile device using feedback from the baseband according to one embodiment of the invention. The method 400, as shown in FIG. 4, starts at Block 401, with the thermal control module 31 included in the application processor 3 of the mobile device 1 receiving a temperature reading ($T_{measured}$) from at least one temperature sensor 9 included in the mobile device 1. The temperature sensor 9 may provide a temperature reading periodically to the thermal control module 31. At Block 402, the thermal control module 31 compares the temperature reading ($T_{measured}$) to a threshold temperature ($T_{threshold}$) The threshold temperature ($T_{threshold}$) may be a temperature level that is determined to be the highest desired temperature that may be measured in the mobile device 1. In some embodiments, the threshold temperature ($T_{threshold}$) may be predetermined and set in the factory setting. If the temperature reading ($T_{measured}$) is greater than the threshold temperature ($T_{threshold}$), the thermal control module 31 sends a power cap setting message to the baseband 4 which sets a power cap on the transmission power of the mobile device 1 (Block 403). As shown in FIG. 4, if the temperature reading ($T_{measured}$) is less than or equal to the threshold temperature ($T_{threshold}$), the thermal control module 31 waits to receive a subsequent temperature reading ($T_{measured}$) from the temperature sensor 9 (Block 404). While the power cap is set by the transmit power controller 41 in the baseband 4, at Block 405, if the thermal control module 31 receives a feedback message from the uplink status monitor 42 that indicates that the mobile device 1 is transmitting a critical message, the thermal control module 31 sends a power cap release message to the transmit power controller 41 to release the power cap for at least a period of time ($T_{wait}$). The period of time ($T_{wait}$) may be the amount of time required for the mobile device 1 to complete transmission of the critical message. In some embodiments, that period of time ($T_{wait}$) is calculated by the uplink status monitor 42 in the baseband 4 and included in the feedback message to the thermal control module 31. The critical message may be, for instance, a handover request message from the mobile device to a base station.

In one embodiment, when the baseband 4 previously received the feedback message from the uplink status monitor 42 with the period of time ($T_{wait}$) to release the power cap, the thermal control module 31 is to wait until the expiration of at least the period of time ($T_{wait}$) before the thermal control module 31 sends a subsequent power cap setting message at Block 403. In this embodiment, even if the measured temperature ($T_{measured}$) is greater than the threshold temperature ($T_{threshold}$), the thermal control module 31 does not send a power cap setting message if the period of time ($T_{wait}$) has not yet expired.

In some embodiments, mobile device 1 may include a plurality of different antennas including higher and lower efficiency antennas. When the lower efficiency antenna is being used, a higher amount of transmission power may be required to ensure that signals are being appropriately sent and received. Thus, the user experience is improved by ensuring that the transmit power is not limited when the lower efficiency antenna is being used. Referring back to FIG. 4, while the power cap is set by the transmit power controller 41 in the baseband 4, at Block 406, if the thermal control module 31 receives an antenna feedback message from the antenna monitor 43 that indicates that the lower efficiency antenna is being used by the mobile device 1, the thermal control module 31 sends the power cap release message to the power transmit controller 41 to release the power cap for a period of time.

III. Thermal Control Method Based on the Network Requirements

Figure 5:
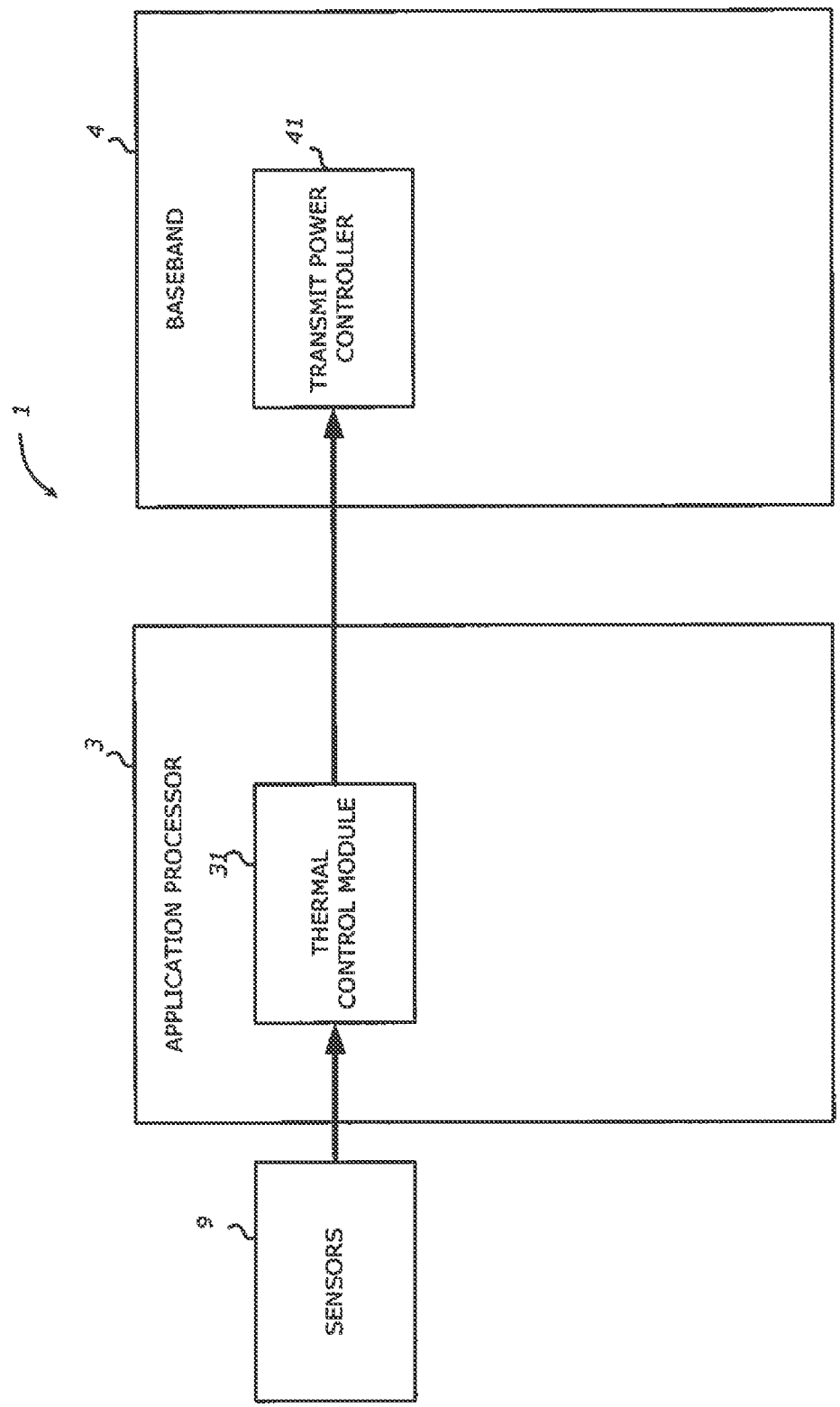
FIG. 5 shows a block diagram of the example mobile device implementing a thermal control method according to one embodiment of the invention.

FIG. 5 shows a block diagram of the example mobile device implementing a thermal control method according to one embodiment of the invention. The mobile device 1, as shown in FIG. 5, includes sensors 9, application processor 3 and baseband 4. In this embodiment, the application processor 3 sends messages to the transmit power controller 41 to set and release the power cap on the transmission power of the mobile device 1 without any feedback from the baseband 4. The sensors 9 include at least one temperature sensor that measures a temperature reading at a location in the mobile device 1. The application processor 3 includes a thermal control module 31 that periodically receives temperature reading ($T_{measured}$) from sensors 9 and compares the temperature reading to a threshold temperature ($T_{threshold}$). When the temperature reading from the sensors 9 exceeds the threshold temperature ($T_{measured} > T_{threshold}$), the thermal control module 31 sends a power cap setting message to the baseband 4.

As shown in FIG. 5, the baseband 4 includes a transmit power controller 41 that sets a power cap on the transmit power of the mobile device 1 when it receives the power cap setting message from the thermal control module 31 and releases the power cap on when it receives the power cap release message from the thermal control module 31.

In this embodiment, while the power cap is set by the transmit power controller 41 in the baseband 4, the thermal control module 31 sends a power cap release message at a periodic or aperiodic time interval to release the power cap for a period of time. For instance, the periodic or aperiodic time interval is based on the message sending requirements of a network (e.g., Transmit Time Interval (TTI)).

Figure 6:
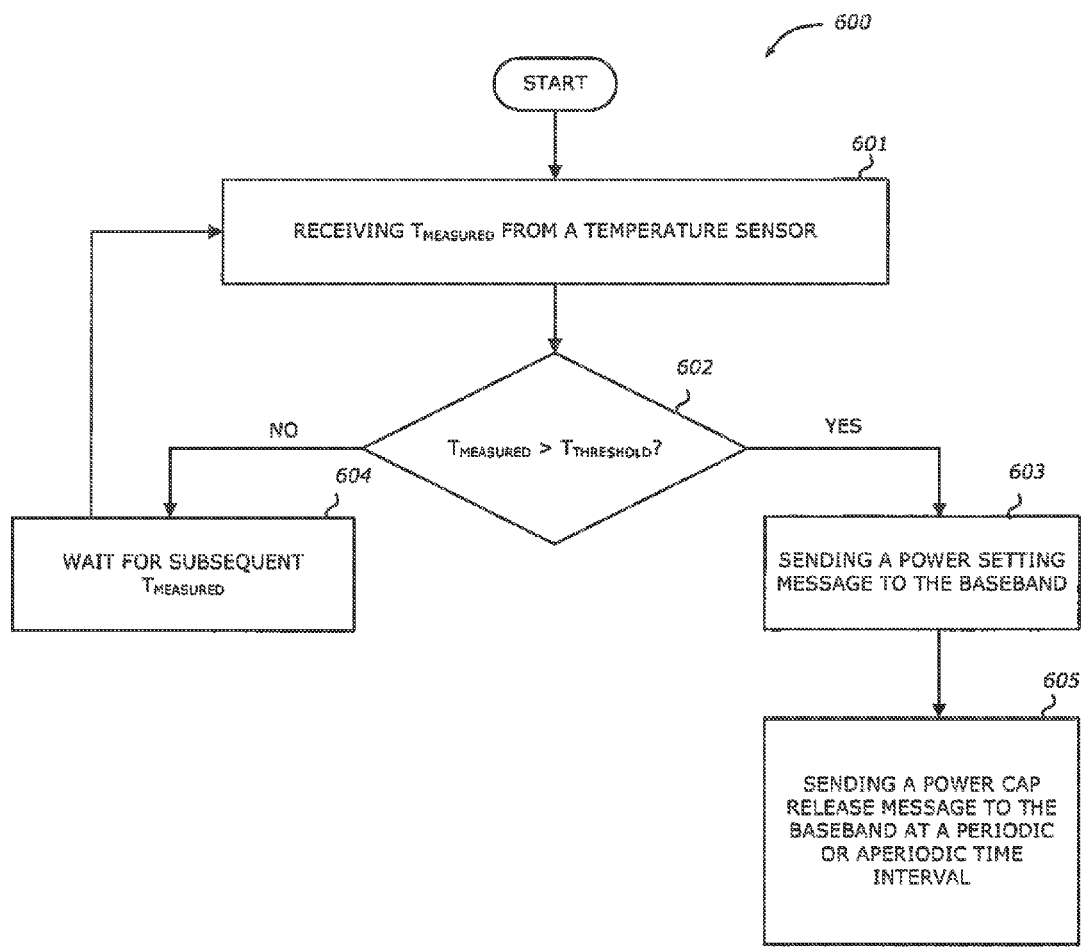
FIG. 6 illustrates a flow diagram of a thermal control method being implemented in a mobile device according to one embodiment of the invention.

FIG. 6 illustrates a flow diagram of a thermal control method being implemented in a mobile device according to one embodiment of the invention. In method 600, the application processor 3 sends messages to the transmit power controller 41 to set and release the power cap on the transmission power of the mobile device 1 without any feedback from the baseband 4. Similar to method 400, method 600 starts, at Block 601, with the thermal control module 31 included in the application processor 3 of the mobile device 1 receiving a temperature reading ($T_{measured}$) from at least one temperature sensor 9 included in the mobile device 1. The temperature sensor 9 may provide a temperature reading periodically to the thermal control module 31. At Block 602, the thermal control module 31 compares the temperature reading ($T_{measured}$) to a threshold temperature ($T_{threshold}$). If the temperature reading ($T_{measured}$) is greater than the threshold temperature ($T_{threshold}$), the thermal control module 31 ends a power cap setting message to the baseband 4 which sets a power cap on the transmission power of the mobile device 1 (Block 603). If the temperature reading ($T_{measured}$) is less than or equal to the threshold temperature ($T_{threshold}$), the thermal control module 31 waits to receive a subsequent temperature reading ($T_{measured}$) from the temperature sensor 9 (Block 604).

While the power cap is set by the transmit power controller 41 in the baseband 4, at Block 605, the thermal control module 31 sends a power cap release message at a periodic or aperiodic time interval to release the power cap for a period of time. For instance, the periodic or aperiodic time interval is based on the message sending requirements of a network. Accordingly, the release of the power cap coincides with the periodic or aperiodic network-required reporting that is sent from the mobile device 1 to the network. The messages being sent in the periodic or aperiodic network-required reporting may be critical messages (e.g., handover requests and measurement reports). By preventing the power transmission level from being capped when a network required message is scheduled to be sent, the power that is required by the mobile device 1 to send the network required message is ensured to available regardless of the temperature ($T_{measured}$) that is detected. Further, this also ensures that the messages that are required from the mobile device 1 by the network are properly sent and received from the mobile device 1.

IV. Thermal Control Method Based on Whether a Voice Call is being Performed

Figure 7:
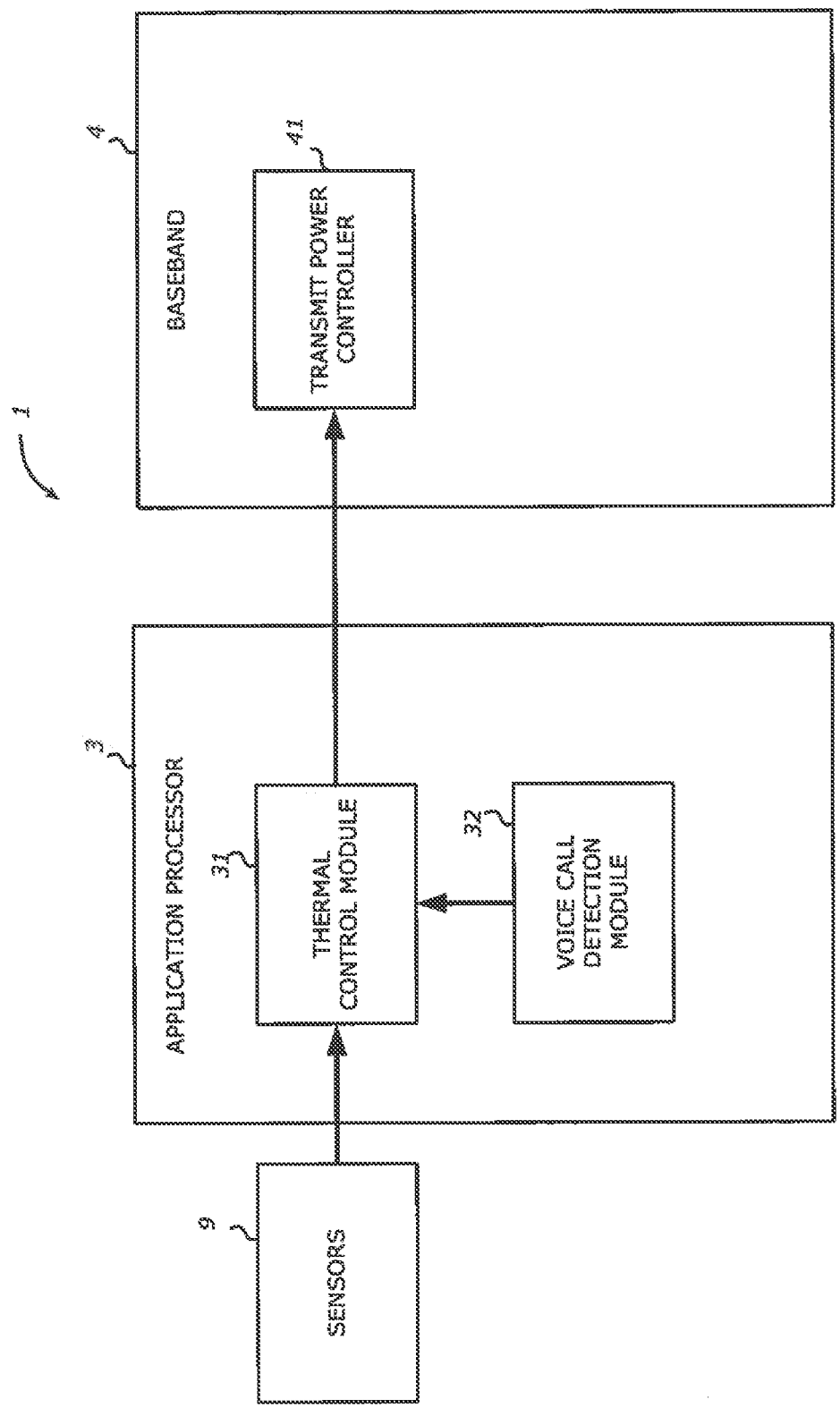
FIG. 7 shows a block diagram of the example mobile device implementing a thermal control method according to one embodiment of the invention.

FIG. 7 shows a block diagram of the example mobile device implementing a thermal control method according to one embodiment of the invention. The mobile device 1 in FIG. 7 includes sensors 9, application processor 3 and baseband 4. In this embodiment, the application processor 3 takes into account whether a voice call setup is being performed by the mobile device when sending messages to the transmit power controller 41 to set and release the power cap on the transmission power. When a voice call setup is being performed, a power cap may not be desired since in order to ensure that the transmit power required to set up the call is available.

As shown in FIG. 7, the application processor 3 includes a thermal control module 31 and a voice call detection module 32. The thermal control module 31 periodically receives temperature reading ($T_{measured}$) from sensors 9 and compares the temperature reading to a threshold temperature ($T_{threshold}$). The voice call detection module 32 determines whether the mobile device 1 is performing a voice call setup procedure. For instance, when a user dials a phone number or when the number has been inputted and the call is attempting to be connected, the voice call detection module 32 detects that the voice call setup is being performed. In other embodiments, the voice call detection module 32 also determines that a voice call setup is being performed when the mobile device 1 is receiving an incoming call (e.g., the mobile device 1 is ringing). In some embodiments, the voice call detection module 32 may send a signal to the thermal control module 31 indicating that the voice call setup is being performed.

The thermal control module 31 sends a power cap setting message to the baseband 4 when (i) the thermal control module 31 determines that temperature reading from the sensors 9 exceeds the threshold temperature ($T_{measured} > T_{threshold}$) and (ii) the voice call detection module 32 determines that a voice call setup is not being performed. The thermal control module 31 sends a power cap release message to the baseband 4 when (i) the power cap is set and (ii) the mobile device is performing the voice call setup.

As shown in FIG. 7, the baseband 4 includes a transmit power controller 41 that sets a power cap on the transmit power of the mobile device 1 when it receives the power cap setting message from the thermal control module 31 and releases the power cap on when it receives the power cap release message from the thermal control module 31.

In another embodiment, the application processor 3 includes the portion of the thermal control module 31 that receives temperature readings ($T_{measured}$) from the sensor 9, compares the temperature reading ($T_{measured}$) to the threshold temperature ($T_{threshold}$) and sends the power cap setting message to the power transmit controller 41. In this embodiment, the baseband 4 includes the portion of the thermal control module 31 that sends the power cap release message to power transmit controller 41. The baseband 4 may also include the voice call detection module 32. Accordingly, when the portion of the thermal control module 31 included in the baseband 4 receives a signal from the voice call detection module 32 that indicates that a voice call is being performed, the power cap release message is sent to the power transmit controller 41.

Figure 8:
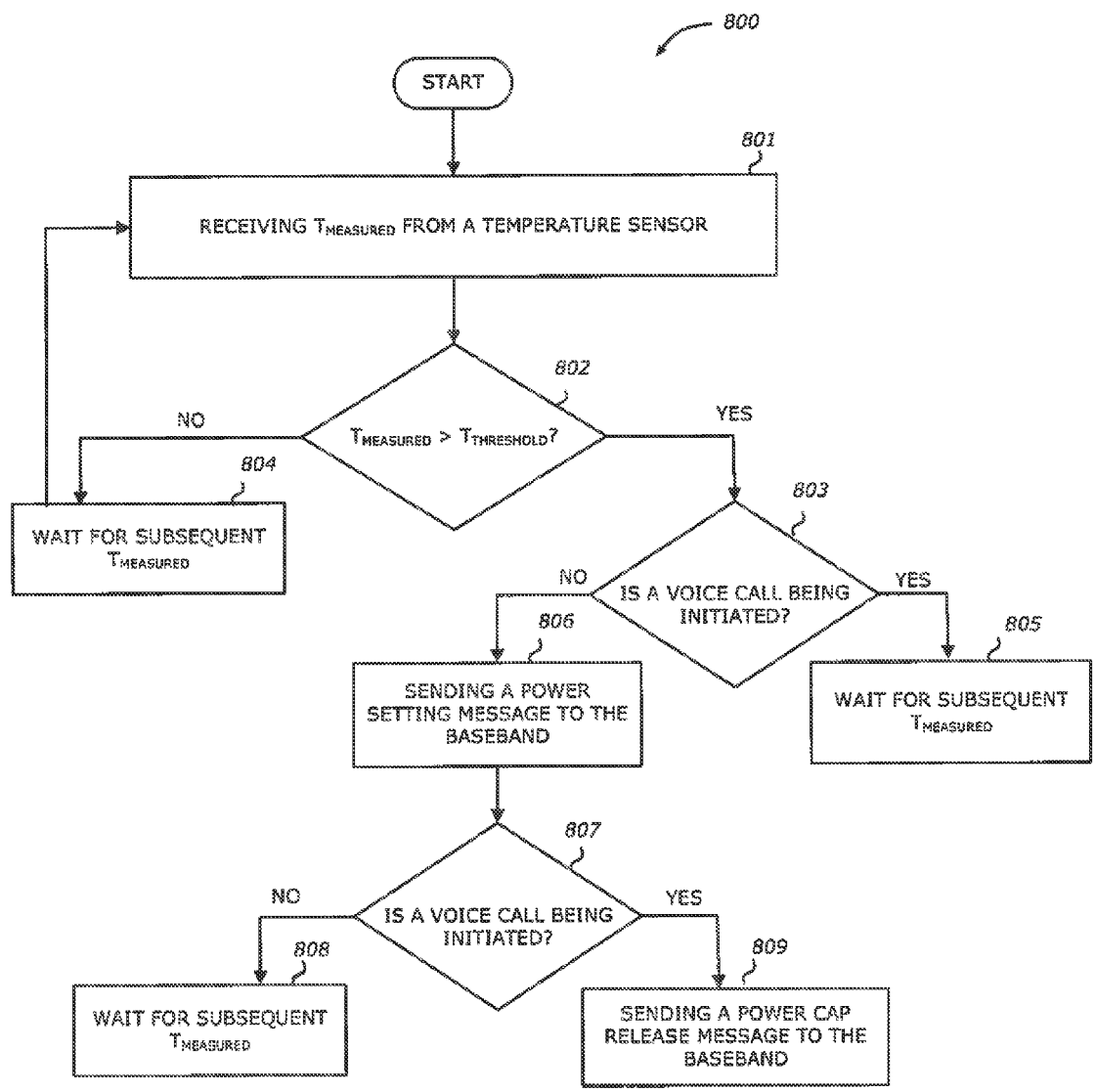
FIG. 8 illustrates a flow diagram of a thermal control method being implemented in a mobile device according to one embodiment of the invention.

FIG. 8 illustrates a flow diagram of a thermal control method being implemented in a mobile device according to one embodiment of the invention. This method 800 may be implemented by the mobile device 1 in FIG. 7. Similar to method 600, method 800 starts, at Block 801, with the thermal control module 31 included in the application processor 3 of the mobile device 1 receiving a temperature reading ($T_{measured}$) from at least one temperature sensor 9 included in the mobile device 1. The temperature sensor 9 may provide a temperature reading periodically to the thermal control module 31. At Block 802, the thermal control module 31 compares the temperature reading to a threshold temperature ($T_{threshold}$). If the temperature reading ($T_{measured}$) is less than or equal to the threshold temperature ($T_{threshold}$), the thermal control module 31 waits to receive a subsequent temperature reading ($T_{measured}$) from the temperature sensor 9 (Block 804).

If the temperature reading ($T_{measured}$) is greater than the threshold temperature ($T_{threshold}$), at Block 803, the voice call detection module 32 determines whether a voice call setup is being performed by the mobile device 1. If the voice call detection module 32 determines that a voice call setup is being performed, the thermal control module 31 waits to receive a subsequent temperature reading ($T_{measured}$) from the temperature sensor 9 (Block 805). However, if the voice call detection module 32 determines that a voice call setup is not being performed, the thermal control module 31 sends a power cap setting message to the transmit power controller 41 included in the baseband 4. When the transmit power controller 41 receives the power cap setting message, the transmit power controller 41 that sets a power cap on the transmit power.

While the power cap is set on the mobile device 1, at Block 807, the voice call detection module 32 determines that a voice call setup is being performed. For instance, if after the transmit power controller 41 has set the power cap and the mobile device 1 is in the process of operating at a capped transmission power level, the user initiates a phone call, the voice call detection module 32 would determine that the voice call setup is being performed at Block 807. As illustrated in FIG. 8, if a voice call setup is determined to be performed, the thermal control module 31 sends a power cap release message to the transmit power controller 41 (Block 809). When the transmit power controller 41 receives the power cap release message, the transmit power controller 41 that releases the power cap on the transmit power. However, if the voice call setup is not determined to be performed, then the thermal control module 31 waits to receive a subsequent temperature reading ($T_{measured}$) from the temperature sensor 9.

In this embodiment, after the power cap is released at Block 809, the method 800 waits until the voice call is established (i.e., no longer being performed) and resumes waiting for the subsequent temperature reading ($T_{measured}$), at Block 801. For instance, after power cap is released at Block 809, if the voice call is established between the caller and the callee, the mobile device 1 may resume determining whether a power cap is needed to be set based on the temperature reading ($T_{measured}$) being received.

This method 800 allows for the application processor 3 to set the power cap based on temperature readings obtained from the sensors but also taking into account whether the mobile device is setting up a voice call. Accordingly, this embodiment ensures that the transmit power required to set up the call is available to the mobile device 1.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method implemented in a mobile device, the method comprising:
   receiving a temperature reading from a sensor included on the mobile device;
   comparing the temperature reading to a threshold temperature;
   sending a power cap setting message to set a power cap when the temperature reading is greater than the threshold temperature, wherein the power cap is a non-zero maximum transmission power of the mobile device; and
   sending a power cap release message to release the power cap for at least a period of time if (i) the power cap is set and (ii) a feedback message is received, the feedback message indicating that the mobile device is transmitting a critical message.

2. The method of claim 1, further comprising:
   sending the power cap release message to release the power cap for the period of time if (i) the power cap is set and (ii) an antenna feedback message is received, the antenna feedback message indicating that a lower efficiency antenna is being used by the mobile device.

3. The method of claim 2, wherein the antenna feedback message is generated by a baseband included in the mobile device.

4. The method of claim 1, wherein the feedback message is generated by a baseband included in the mobile device.

5. The method of claim 1, wherein the critical message is a handover request message from the mobile device to a base station.

6. The method of claim 1, wherein the feedback message includes the period of time.

7. The method of claim 1, wherein sending the power cap setting message includes sending the power cap setting message from an application processor to a baseband to set the power cap, and wherein sending the power cap release message includes sending the power cap release message from the application processor to the baseband to release the power cap.

8. The method of claim 1, wherein sending the power cap setting message includes sending the power cap setting message from a baseband to set the power cap, and wherein sending the power cap release message includes sending the power cap release message from a baseband to release the power cap.

9. A mobile device comprising:
   a temperature sensor to measure a temperature reading at a location in the mobile device; and
   a processor to:
      periodically receive the temperature reading from the sensor,
      compare the temperature reading to a threshold temperature,
      send a power cap setting message to set a power cap in a baseband of the mobile device wherein the power cap is a non-zero maximum transmission power of the mobile device, when the temperature reading is greater than the threshold temperature, and
      send a power cap release message if (i) the power cap is set and (ii) a feedback message is received, the feedback message indicating that the mobile device is presently transmitting a critical message;
      wherein the power cap is released for at least a period of time when the power cap release message is received.

10. The mobile device in claim 9, wherein the critical message is a handover request message from the mobile device to a base station.

11. The mobile device in claim 9, wherein the feedback message is generated by the baseband included in the mobile device.

12. The mobile device in claim 9 wherein the feedback message includes the period of time.

13. The mobile device in claim 9 wherein the processor is to send a power cap release message if (i) the power cap is set and (ii) an antenna feedback message is received indicating that a lower efficiency antenna is being used by the mobile device.

14. The mobile device of claim 9 wherein the processor is an application processor, and both the power cap release message and the power cap setting message are sent from the application processor to the baseband in the mobile device.

15. A mobile device comprising:
   a plurality of antennas having different efficiencies;
   a temperature sensor; and
   a processor to periodically receive a temperature reading from the sensor, compare the reading to a threshold, and send a power cap setting message to set a power cap in a baseband of the mobile device when the reading is greater than the threshold, wherein the power cap is a non-zero maximum transmission power of the mobile device, and send a power cap release message to release the power cap for a least a period of time if (i) the power cap is set and (ii) an antenna feedback message is received indicating that a lower efficiency antenna, of said plurality of antennas, is being used by the mobile device.

16. The mobile device of claim 15 wherein the antenna feedback message is generated by the baseband included in the mobile device.

17. The mobile device of claim 15 wherein the feedback message includes the period of time.

18. The mobile device of claim 15 wherein the processor is an application processor, and both the power cap release message and the power cap setting message are sent from the application processor to the baseband in the mobile device.

19. The mobile device of claim 15, wherein the power cap setting message prevents an RF transceiver from reaching a high level of transmit power, and the power cap release message allows the RF transceiver to reach the high level of transmit power.

20. The mobile device of claim 9, wherein the power cap setting message prevents an RF transceiver from reaching a high level of transmit power, and the power cap release message allows the RF transceiver to reach the high level of transmit power.

21. The method of claim 1, wherein the power cap setting message prevents an RF transceiver from reaching a high level of transmit power, and the power cap release message allows the RF transceiver to reach the high level of transmit power.

\* \* \* \* \*